(12) United States Patent
Karnam et al.

(10) Patent No.: US 8,462,729 B2
(45) Date of Patent: Jun. 11, 2013

(54) METHOD AND APPARATUS TO FACILITATE NETWORK PROCESSES

(75) Inventors: Pramod Karnam, Rolling Meadows, IL (US); Alex P. Hirsbrunner, Bloomingdale, IL (US); Paula Tjandra, Hoffman Estates, IL (US); Karen M. Upp, Bartlett, IL (US)

(73) Assignee: Motorola Mobility LLC, Libertyville, IL (US)

( * ) Notice: Subject to any disclaimer, the term of this patent is extended or adjusted under 35 U.S.C. 154(b) by 768 days.

(21) Appl. No.: 12/347,125

(22) Filed: Dec. 31, 2008

(65) Prior Publication Data
US 2010/0167747 A1 Jul. 1, 2010

(51) Int. Cl.
*H04W 4/00* (2009.01)

(52) U.S. Cl.
USPC ..... 370/331; 370/313; 455/432.1; 455/432.2; 455/456.1

(58) Field of Classification Search
USPC ............... 370/313, 331; 455/432.1, 432.2, 455/433, 456.1
See application file for complete search history.

(56) References Cited

U.S. PATENT DOCUMENTS

| 2005/0237984 A1* | 10/2005 | Benveniste | 370/338 |
| 2007/0293244 A1 | 12/2007 | Lee et al. | |
| 2009/0253443 A1* | 10/2009 | Bichot | 455/458 |

FOREIGN PATENT DOCUMENTS

| EP | 1863310 A2 | 12/2007 |
| WO | 2007139353 A1 | 12/2007 |

* cited by examiner

*Primary Examiner* — Allahyar Kasraian (57) ABSTRACT

One determines (101, 102) that a given wireless mobile two-way communications platform is updating its network location (using, for example, an 802.16(*e*)-compatible protocol) at a time when there is no downlink traffic to provide to the platform and at a time when the platform should conduct at least one of an authenticator relocation process and an Internet Protocol address renewal process. In response to such determinations, one then automatically provides (103) to the platform, as part of updating the network location for the platform, an indication (such as, for example, a downlink traffic pending (DTP) flag) that the platform has pending downlink traffic notwithstanding that there is, in fact, no downlink traffic to provide to the wireless mobile two-way communications platform. Subsequent to this, one can then automatically cause (104) the platform to effect at least one of the authenticator relocation process and the Internet Protocol address renewal process.

15 Claims, 5 Drawing Sheets

METHOD AND APPARATUS TO FACILITATE NETWORK PROCESSES

TECHNICAL FIELD

This invention relates generally to networked communications and more particularly to either of authenticator relocation processes and Internet Protocol address renewal processes.

BACKGROUND

Communications via and with a network comprise a well-understood area of endeavor. Such communications can include both end-user bearer content as well as system-based communications. Examples of the latter can include, but are certainly not limited to, authenticator relocation processes and Internet Protocol address renewal processes.

Idle mobile stations are typically required to renew their idle mode state and corresponding idle mode configuration (including, for example, their Internet Protocol address(es), security keys, and so forth) from time to time by transmitting periodic location updates to the network. Some of these idle mode configurations (as such, but not limited to, paging controller information, foreign agent information, anchor authenticator information, and so forth) are subject to mobility-based changes on the part of mobile end-user platforms. In these regards a mobile station is typically required to assume an active state in order to perform the respective procedures to maintain their idle mode re-entry state. This can relate, for example, to such processes as dynamic host configuration protocol (DHCP) renewal, authenticator relocation, mobile Internet Protocol (MIP) re-binding, and so forth.

Unfortunately, as a general rule, the mobile station is not aware of corresponding network topology and further cannot detect changes in their foreign agent and/or authenticator (as the latter are not typically broadcast). Compounding this situation is that the existing Network Working Group (NWG) v.2.1 specification does not provide guidance regarding when a network should perform authenticator relocation or data path relocation (for example, via foreign agent-home agent re-binding) when a change in the mobile station's foreign agent/Data Path Function (FA/DPF) is detected. Accordingly, when a given network does decide to perform, for example, FA/DPF or authenticator relocation, the network pages the mobile station to bring the mobile station to an active state to thereby enable performing an Internet Protocol address refresh, authenticator relocation, and so forth. Such a procedure can consume, in some application settings, upwards of 730 milliseconds. When such procedures are not performed, however, this can lead to considerable supplemental delay and/or loss of data during idle mode re-entry.

BRIEF DESCRIPTION OF THE DRAWINGS

The above needs are at least partially met through provision of the method and apparatus to facilitate network processes described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, one can determine that a given wireless mobile two-way communications platform is updating its network location (using, for example, an 802.16(e)-compatible protocol) at a time when there is no downlink traffic to provide to the wireless mobile two-way communications platform and one can also determine that the wireless mobile two-way communications platform should conduct at least one of an authenticator relocation process and an Internet Protocol address renewal process. In response to such determinations, one can then automatically provide to the wireless mobile two-way communications platform, as part of updating the network location for the wireless mobile two-way communications platform, an indication (such as, for example, a downlink traffic pending (DTP) flag) that the wireless mobile two-way communications platform has pending downlink traffic notwithstanding that there is, in fact, no downlink traffic to provide to the wireless mobile two-way communications platform.

Subsequent to this, one can then automatically cause the wireless mobile two-way communications platform to effect at least one of the authenticator relocation process and the Internet Protocol address renewal process.

By one approach, determining that this platform should conduct an authenticator relocation process and/or an Internet Protocol address renewal process can comprise detecting a network topological change as corresponds to the wireless mobile two-way communications platform.

So configured, those skilled in the art will recognize and appreciate that when the mobile station re-enters the network in response to the indication of pending downlink traffic, the network can and will then trigger authenticator relocation and/or foreign agent relocation as per the stipulations of NWG v.1.3. It will further be appreciated that these procedures such as authenticator relocation and Internet Address renewal can be accomplished for an idle-mode mobile station without requiring initiation of a paging procedure as presently occurs in the prior art. This, alone, can assist in avoiding upwards of 250 milliseconds of latency in these regards. These teachings notably can achieve these benefits by leveraging existing messages and defined bits to trigger these higher level functions thereby avoiding a need to introduce new messages into existing systems.

Figure 1:
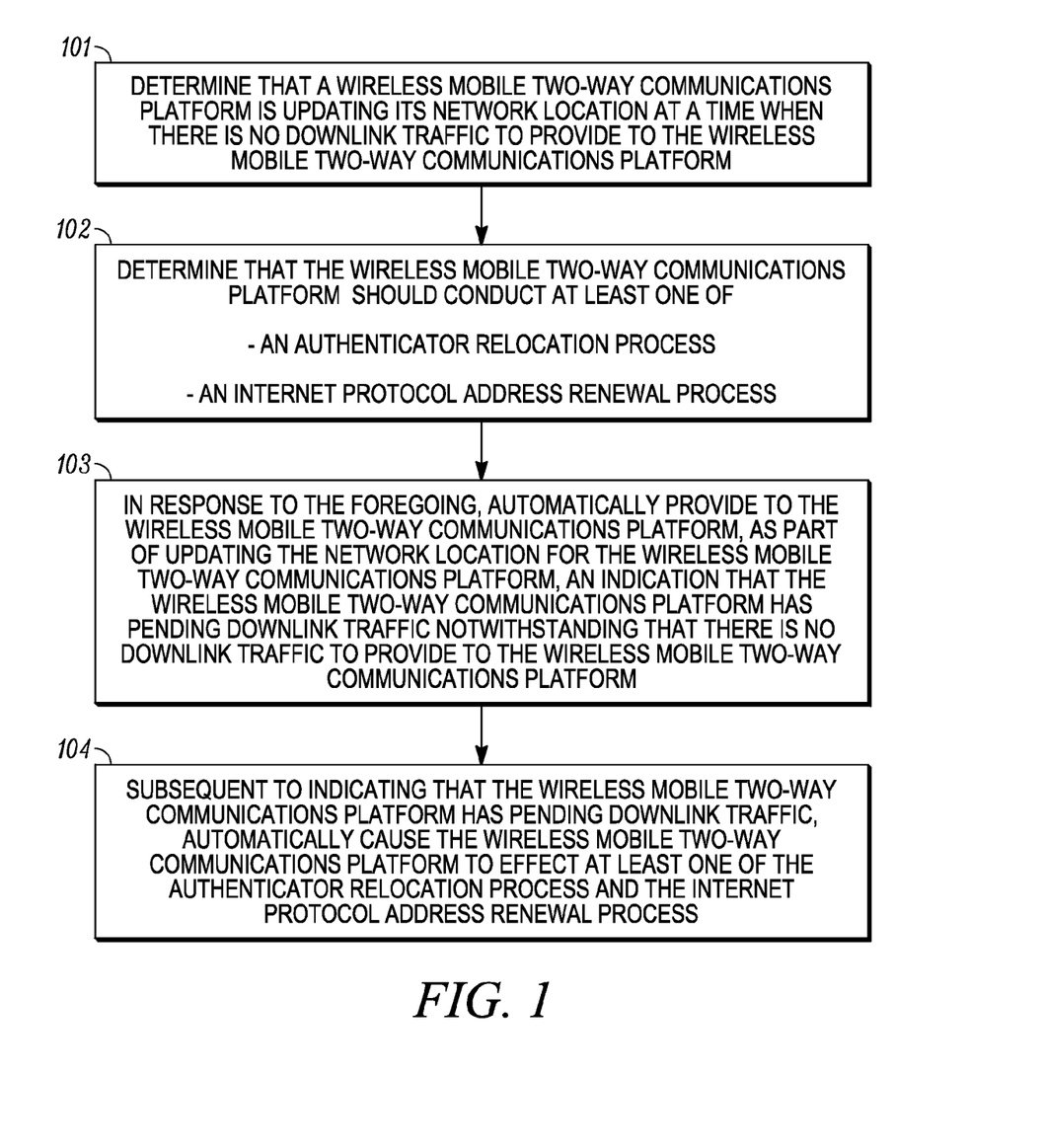
FIG. 1 comprises a flow diagram as configured in accordance with various embodiments of the invention.

These and other benefits may become clearer upon making a thorough review and study of the following detailed description. Referring now to the drawings, and in particular to FIG. 1, an illustrative process 100 that is compatible with many of these teachings will now be presented. This process can be carried out, for example, by an Authenticator or a paging controller network component in an Access Services Network (ASN).

This process 100 includes the step 101 of determining that a wireless mobile two-way communications platform is updating its network location at a time when there is no downlink traffic to provide to the wireless mobile two-way communications platform. (As used herein, it will be understood that the expression "downlink traffic" is limited to payload content and does not include control signaling or other traffic that comprises and supports the signaling protocol(s) of the network itself.) Such updating can be expected to occur from time to time. This determination can be based upon a direct reception of such an update or can comprise indirect information based upon reception of such an update by another network element. When relying upon indirect information, these teachings will accommodate using a pull-based approach and/or a push-based approach to arrange for the availability of the indirect information.

This process 100 also includes the step 102 of determining that the wireless mobile two-way communications platform should conduct at least one of an authenticator relocation process and an Internet Protocol address renewal process. The determination that the wireless mobile two-way communications platform should conduct an authenticator relocation process can be based upon detecting that the mobile two-way communications platform has moved to a network location that is handled by a different authenticator. The determination that the wireless mobile two-way communications platform should conduct an Internet Protocol address renewal process can comprise, for example, detecting a network topological change as corresponds to the wireless mobile two-way communications platform. An example of such a topological change can comprise moving into a network area serviced by a new the foreign agent or a different VLAN.

Step 103, in turn, provides for responsively automatically providing to the wireless mobile two-way communications platform an indication that the wireless mobile two-way communications platform has pending downlink traffic notwithstanding that there is no downlink traffic to provide to the wireless mobile two-way communications platform. By one approach, for example, this can comprise using a downlink traffic pending (DTP) flag as comprises a part of updating the network location as per prior art practice in this regard.

By one approach, this indication can be provided as a part of updating the network location for the wireless mobile two-way communications platform. These teachings will accommodate a variety of approaches in these regards. By one approach, and without intending any limitations in these regards, this can comprise updating the network location in a manner that is compatible with an 802.16(e)-compatible protocol. (As used herein, the word "compatible" will be understood to refer to an ability to successfully interact with another element using a commonly shared and understood communications protocol.)

Using an optional step 104 as desired, this process 100 can then also, subsequent to indicating that the wireless mobile two-way communications platform has pending downlink traffic, automatically cause the wireless mobile two-way communications platform to effect at least one of the authenticator relocation process and the Internet Protocol address renewal process. By one approach, and again without intending any particular limitations in these regards, this can comprise using at least one of a client mobile Internet Protocol (CMIP) process and a proxy mobile Internet Protocol (PMIP)-compatible rebinding process as are known in the art.

Figure 2:
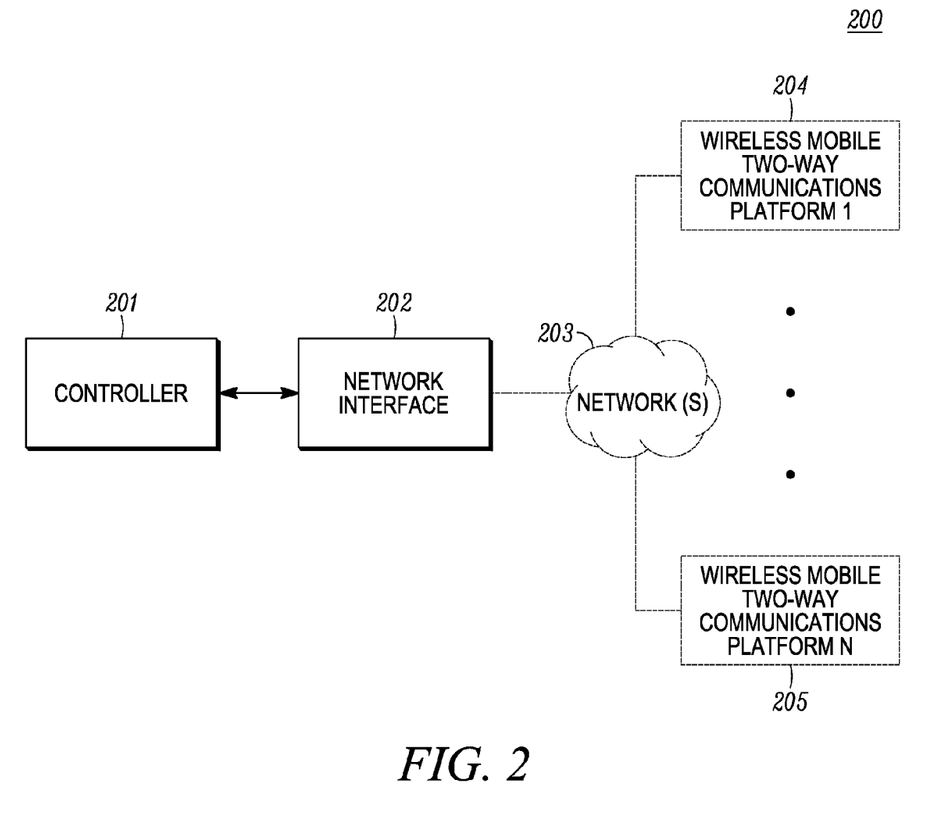
FIG. 2 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 2, an illustrative apparatus 200 embodying such a platform will be provided.

This apparatus 200 can comprise, for example, an authentication serving node though other possibilities exist in these regards. Those skilled in the art will recognize and understand, for example, that the described functionality of this apparatus 200 can be consolidated and integrated with a multi-function platform or can be distributed over multiple platforms if desired. Such architectural options are generally well understood in the art.

This apparatus 200 generally comprises a controller 201 that operably couples to a network interface 202. This network interface 202 serves to operably couple the controller 201 to one or more networks 203 (such as, but not limited to, the Internet, any of a variety of wide area and/or local area networks (including both wireless and non-wireless networks), and so forth) and hence to one or more wireless mobile two-way communications platforms 204, 205. Such network interfaces are well known in the art. As these teachings are not overly sensitive to any particular selection in this regard, for the sake of brevity and the preservation of clarity, further elaboration in this regard will not be presented here.

Those skilled in the art will recognize and appreciate that such a controller 201 can comprise a fixed-purpose hard-wired platform or can comprise a partially or wholly programmable platform. All of these architectural options are well known and understood in the art and require no further description here. This controller 201 can be configured (using, for example, corresponding programming as will be well understood by those skilled in the art) to carry out one or more of the steps, actions, and/or functions described herein. This can comprise, for example, configuring the controller 201 to determine that a wireless mobile two-way communications platform 204 is updating its network location at a time when there is no downlink traffic to provide to the wireless mobile two-way communications platform, to determine that the wireless mobile two-way communications platform should conduct at least one of an authenticator relocation process and an Internet Protocol address renewal process, and in response to the foregoing, automatically provide to the wireless mobile two-way communications platform, as part of updating the network location for the wireless mobile two-way communications platform, an indication that the wireless mobile two-way communications platform has pending downlink traffic notwithstanding that such is not, in fact, the case.

Those skilled in the art will recognize and understand that such an apparatus 200 may be comprised of a plurality of physically distinct elements as is suggested by the illustration shown in FIG. 2. It is also possible, however, to view this illustration as comprising a logical view, in which case one or more of these elements can be enabled and realized via a shared platform. It will also be understood that such a shared platform may comprise a wholly or at least partially programmable platform as are known in the art.

So configured, a wireless mobile two-way communications platform can be guided into accomplishing either or both of the aforementioned tasks in a manner that well accommodates existing supported functionality and that avoids the challenges posed by prior art approaches in these regards. Generally speaking, these teachings serve to determine that a wireless mobile two-way communications platform is updating its network location and also determining that this wireless mobile two-way communications platform should conduct at least one of authenticator relocation process and an Internet Protocol address renewal process. Then, in response to the foregoing, these teachings generally automatically provide to the wireless mobile two-way communications platform (as part of updating the network location for the wireless mobile two-way communications platform) a non-page-based message to thereby place the wireless mobile two-way communications platform into a state that will operationally support conducting at least one of the authenticator relocation process and the Internet Protocol address renewal process.

In the particular embodiments described above, this non-page-based message can comprise an indication that the wireless mobile two-way communications platform has pending downlink traffic (even though no such downlink traffic actually exists). Such an approach can be particularly useful and effective in many application settings because receipt of such an indication is already supported and further because the follow-up corresponding behavior of the wireless mobile two-way communications platform upon receiving such an indication will fully comport with the actions that will lead to undertaking and completing the processes that should be conducted.

For the sake of illustration and certainly with no intent to suggest any specific limitations with respect to these teachings, some more-detailed examples will now be presented. Those skilled in the art will recognize that these examples do not constitute an exhaustive presentation of all possibilities in these regards.

Example 1

Figure 3:
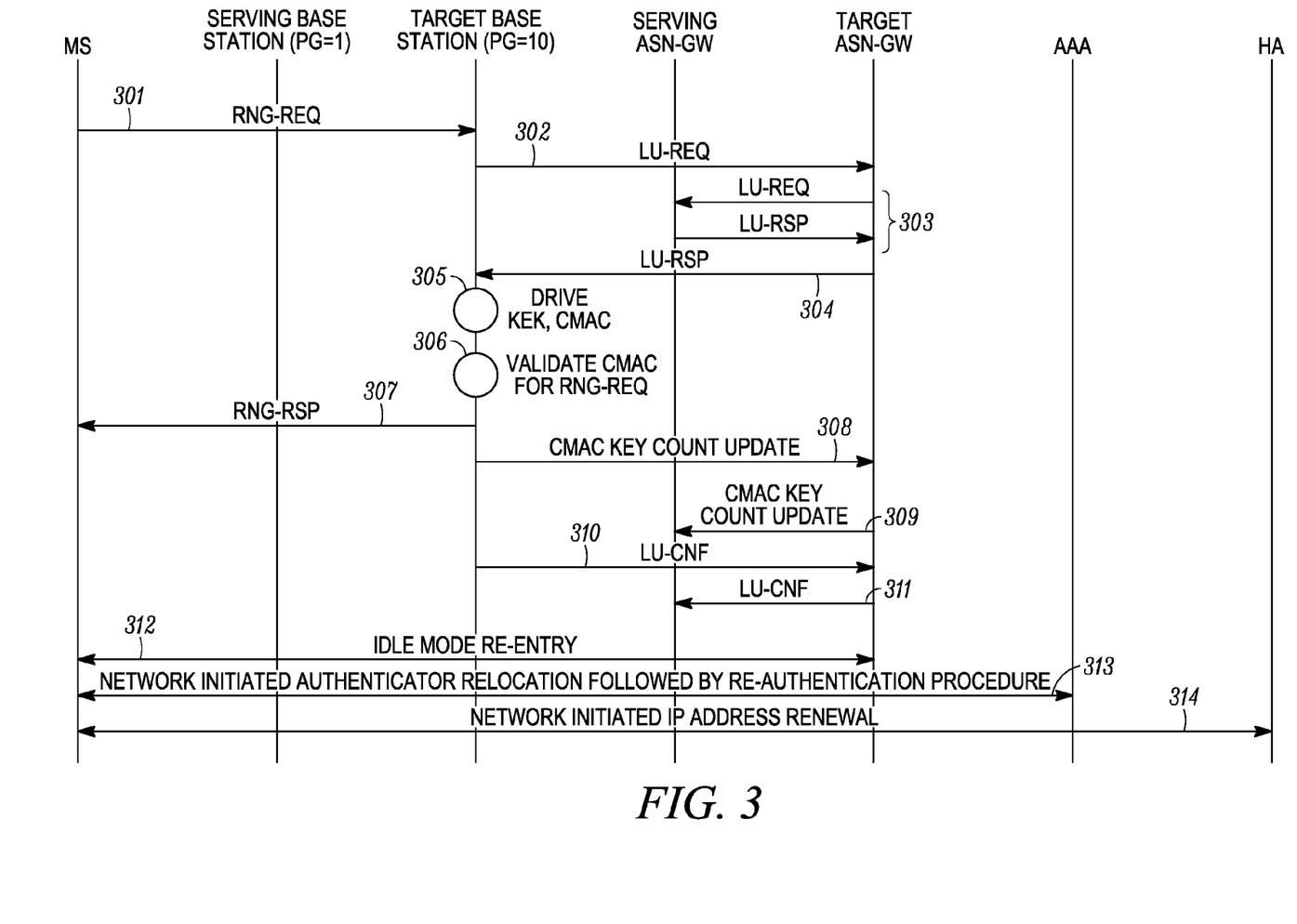
FIG. 3 comprises a call flow diagram as configured in accordance with various embodiments of the invention.

Referring now to FIG. 3, one particular approach to re-entry during relocation will be described. In this example, the presumed initial conditions are that a serving base station (BS) is provisioned with paging groups under paging group 1 (PG1) (where PG1 is located in a serving anchor authentication serving node-gateway (ASN-GW)) and where a target base station is provisioned with page group 10 (PG10) (which is located in a target ASN-GW). It is also presumed that PG1 and PG10 are provisioned as inter-vendor neighboring ASN's.

In this example, a mobile station (MS) moves from the serving base station to the target base station. The mobile station sends an RNG-REQ message 301 to the target base station comprising a location update that presents PG1 as its paging group identifier. The target base station, in response, transmits to the target ASN-GW an LU_Req message 302 that also presents the paging group identifier as PG1.

The target ASN-GW detects that the paging group will/should change and also that the DPF and authenticator for this mobile station has relocated. In accordance with these teachings this prompts the target ASN-GW to relocate the paging group, DPF, and authenticator for this mobile station.

First, the target ASN-GW conducts an exchange of messages 303 with the serving anchor ASN-GW. One of these messages is an LU_Req message that identifies the anchor relocation destination as PG10. The reply from the serving anchor ASN-GW comprises an LU_Rsp message that identifies the anchor paging group identifier as being PG10 and that accepts the anchor relocation request. This message can also fetch the authentication context required to validate the user at the target base station. The target ASN-GW then transmits an LU_Rsp message 304 to the target base station to indicate the (untrue) representation that there is existing pending downlink traffic (by setting, in this example, the downlink traffic pending bit to "1"), to set the anchor paging group identifier to PG10, and to provide the authentication context containing security keys relevant at the target base station.

In response, the target base station derives the corresponding key-encrypting-key (KEK) and complex multiple accumulator (CMAC) information at 305 and then validates the CMAC results for RNG-REQ purposes at 306. Following this, the target base station transmits an RNG-RSP message 307 to the mobile station to present a location update that includes changing the paging group to paging group 10 and the paging group identifier to PG10, and to also indicate (falsely) that there is pending downlink traffic. In this example, the target base station also transmits a CMAC key count update message 308 to the target ASN-GW (which prompts the latter to transmit a corresponding CMAC key count update message 309 to the serving anchor ASN-GW) and an LU_Cnf message 310 to the target ASN-GW to indicate the successful updating of the paging group to PG10 (which prompts the target ASN-GW to transmit a corresponding LU_CNF message 311 to the serving ASN-GW to indicate that success).

As will be well understood by those skilled in the art, the mobile station, upon receiving the aforementioned indication in the location update that there is pending downlink traffic will perform network re-entry at the target base station in order to make itself available to receive that downlink content. This will generally comprise idle mode re-entry 312, network initiated authenticator relocation followed by a re-authentication procedure 313, and network initiated Internet Protocol address renewal (via, for example, CMIP/PMIP re-binding as is well understood in the art) 314.

Example 2

Figure 4:
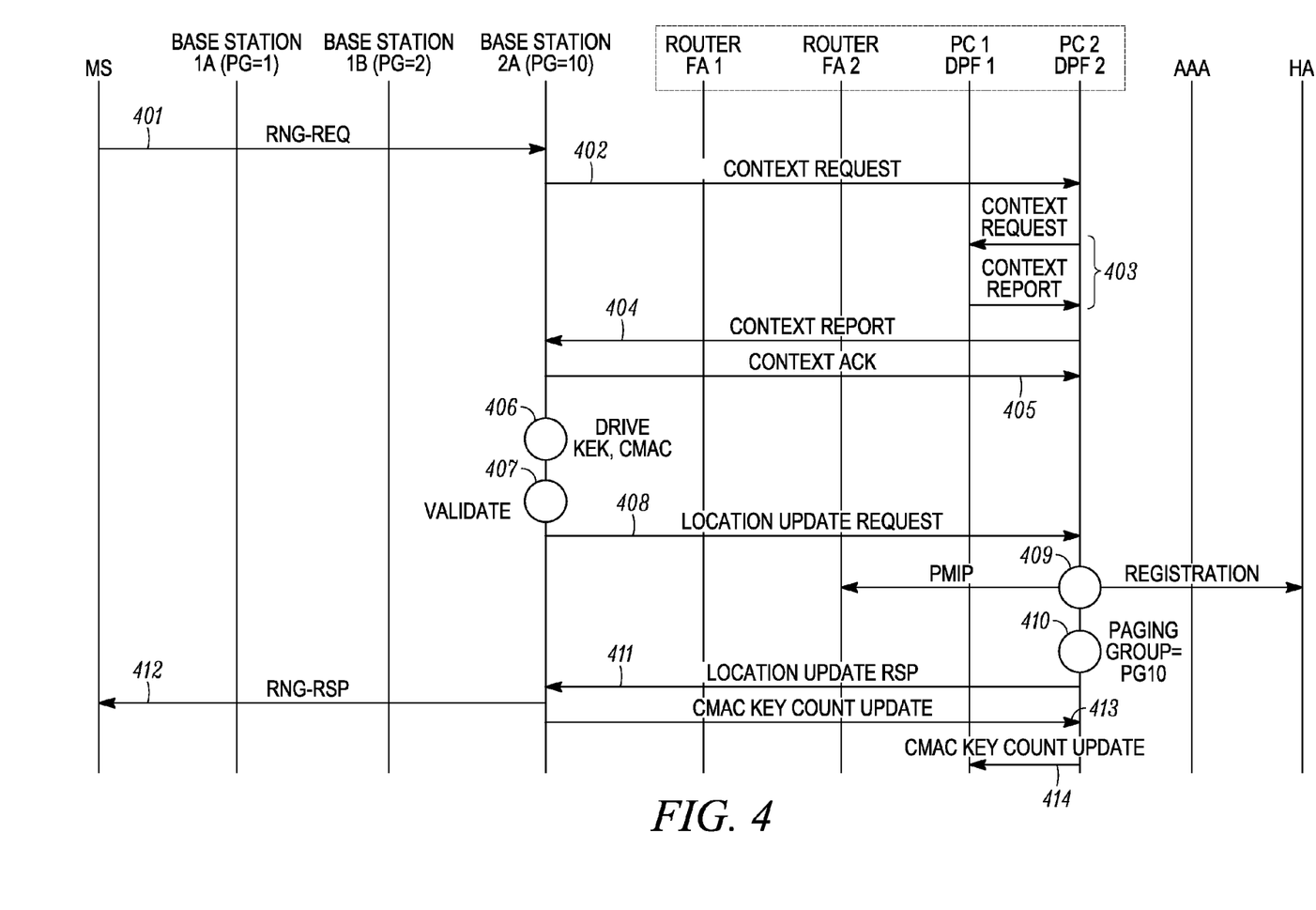
FIG. 4 comprises a call flow diagram as configured in accordance with various embodiments of the invention.

Referring now to FIG. 4, in this example, the functionality of the aforementioned ASN-GW's is distributed over corresponding routers and Paging Controllers. As the mobile station moves from base station 1A to base station 2A the mobile station transmits a RNG_REQ message 401 to base station 2A (i.e., the target base station) which prompts the latter to transmit a context request message 402 (presenting the paging group identifier as being paging group 1 as corresponds to base station 1A) to a Paging Controller/Data Path Function (PC2/DPF2) associated with base station 2A. This, in turn, prompts the latter to exchange messages 403 with a Paging Controller/Data Path Function (PC1/DPF1) associated with base station 1A to present the context request and to receive a corresponding context report. The PC2/DPF2 then transmits a context report in a message 404 to base station 2A and, in response, base station 2A transmits a context acknowledgement message back to the PC2/DPF2. If desired, the PC2/DPF2 can also transmit a context acknowledgement message (not shown) to the PC1/DPF1.

Base station 2A then again derives 406 the corresponding KEK and CMAC values, validates 407 the CMAC value for RNG_REQ, and transmits a location update request 408 to the PC2/DPF2 that identifies the new paging group as being paging group 10 (as corresponds to base station 2A).

The PC2/DPF2 now determines that authenticator relocation is required and detects as well that the paging group for this mobile station has changed and that DPF relocation is required. As a result, the PC2/DPF2 now triggers 409 PMIP registration with the router that serves as foreign agent FA2 and the corresponding home agent (HA) and also selects 410 the new paging group to be paging group 10.

PC2/DPF2 now transmits a location update RSP message 411 to base station 2A to set the new paging group value to paging group 10 and to also indicate (falsely) that the mobile station has pending downlink traffic (by setting, for example, the downlink data pending bit to "1"). Base station 2A responds by sending a RNG_RSP message 412 to the mobile station to update the paging group information and to provide that pending downlink traffic indication. Base station 2A can also transmit a CMAC key count update message 413 to the PC2/DPF2 which will prompt the latter to then transmit a corresponding message 414 to PC1/DPF1.

Figure 5:
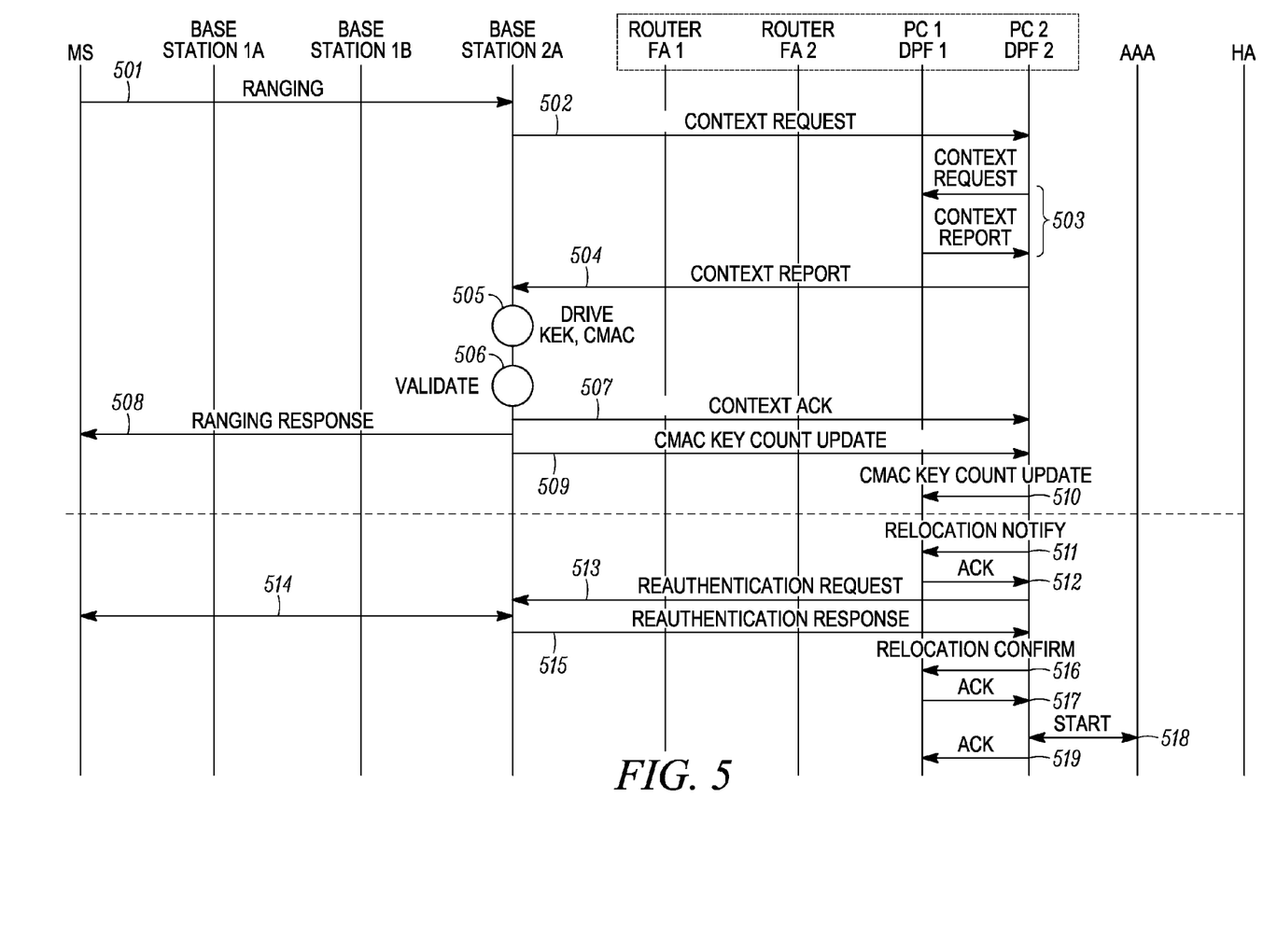
FIG. 5 comprises a call flow diagram as configured in accordance with various embodiments of the invention.

Referring now to FIG. 5, when the mobile station detects the aforementioned downlink pending traffic indication it will perform network re-entry at base station 2A. Accordingly, for example, the mobile station can transmit a ranging message 501 to base station 2A comprising RNG_REQ content. This will prompt base station 2A to transmit a context request message 502 to the PC2/DPF2 (which will then prompt a corresponding exchange 503 of context request and context report messages between the PC2/DPF2 and PC1/DPF1). The PC2/DPF2 will then transmit the context report (comprising, for example, full mobile station context information) in a corresponding message 504.

The base station 2A can then derive 505 the KEK and CMAC values and validate 506 the CMAC value for RNG_REQ purposes following which base station 2A can transmit a context acknowledgement message 507 to the PC2/DPF2 and a ranging response message 508 comprising an RNG_RSP response to the mobile station. Base station 2A can also transmit a CMAC key count update message 509 to the PC2/DPF2 (the latter then responding by transmitting a corresponding CMAC key count update message 510 to the PC1/DPF1).

To trigger authenticator relocation (when desired), the PC2/DPF2 can transmit a relocation notify message 511 to the PC1/DPF1. Upon receiving an acknowledgement message 512 from the PC1/DPF1, the PC2/DPF2 transmits a reauthentication request message 513 (comprising, for example, an extension authentication protocol (EAP) start message) to base station 2A. This will trigger a corresponding exchange of messages 514 between the mobile station and base station 2A following which base station 2A will transmit a reauthentication response message 515 to the PC2/DPF2 (to indicate, for example the successful completion of the EAP activity).

The PC2/DPF2 can then transmit a relocation confirmation message 516 to the PC1/DPF1 and receive a corresponding acknowledgement message 517 therefrom. An accounting start message 518 is then transmitted to an authentication, authorization, and accounting network element with a corresponding acknowledgement message 519 being transmitted to the PC1/DPF1.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As but one example in these regards, the described approach can be used, if desired, to move a mobile station from an idle state to an active mode whenever a determination is made that the mobile station should be brought to an active mode for any reason and not only in response to the described triggers of determining that the wireless mobile two-way communications platform should conduct at least one of an authenticator relocation process or an Internet Protocol address renewal process.

We claim:

1. A method comprising:
   determining that a wireless mobile two-way communications platform is updating its network location at a time when there is no downlink traffic to provide to the wireless mobile two-way communications platform;
   determining that the wireless mobile two-way communications platform should be brought to an active mode;
   in response to determining that the wireless mobile two-way communications platform is updating its network location and determining that the wireless mobile two-way communications platform should be brought to the active mode, automatically providing to the wireless mobile two-way communications platform, as part of updating the network location for the wireless mobile two-way communications platform, a false indication that the wireless mobile two-way communications platform has pending downlink traffic although there is no downlink traffic to provide to the wireless mobile two-way communications platform.

2. The method of claim 1 wherein determining that the wireless mobile two-way communications platform should be brought to an active mode comprises determining that the wireless mobile two-way communications platform should conduct at least one of:
   an authenticator relocation process;
   an Internet Protocol address renewal process.

3. The method of claim 2 wherein determining that the wireless mobile two-way communications platform should conduct at least one of an authenticator relocation process and an Internet Protocol address renewal process comprises detecting a network topological change as corresponds to the wireless mobile two-way communications platform.

4. The method of claim 2 wherein updating the network location for the wireless mobile two-way communications platform comprises updating the network location in a manner that is compatible with an 802.16e/m-compatible protocol.

5. The method of claim 4 wherein automatically providing to the wireless mobile two-way communications platform a false indication that the wireless mobile two-way communications platform has pending downlink traffic comprises using a downlink traffic pending (DTP) flag as comprises a part of updating the network location.

6. The method of claim 2 further comprising:
   subsequent to the false indication that the wireless mobile two-way communications platform has pending downlink traffic, automatically causing the wireless mobile two-way communications platform to conduct at least one of the authenticator relocation process and the Internet Protocol address renewal process.

7. The method of claim 6 wherein effecting the Internet Protocol address renewal process comprises using at least one of a client mobile Internet Protocol (CMIP) and proxy mobile Internet Protocol (PMIP)-compatible rebinding process.

8. An apparatus comprising:
   a network interface;
   a controller operably coupled to the network interface and configured to:

determine that a wireless mobile two-way communications platform is updating its network location at a time when there is no downlink traffic to provide to the wireless mobile two-way communications platform;

determine that the wireless mobile two-way communications platform should conduct at least one of:

an authenticator relocation process;

an Internet Protocol address renewal process;

in response to determining that the wireless mobile two-way communications platform is updating its network location and determining that the wireless mobile two-way communications platform should conduct at least one of the authenticator relocation process and the Internet Protocol address renewal process, automatically provide to the wireless mobile two-way communications platform, as part of updating the network location for the wireless mobile two-way communications platform, a false indication that the wireless mobile two-way communications platform has pending downlink traffic although there is no downlink traffic to provide to the wireless mobile two-way communications platform.

9. The apparatus of claim 8 wherein the controller is further configured to determine that the wireless mobile two-way communications platform should conduct at least one of an authenticator relocation process and an Internet Protocol address renewal process by detecting a network topological change as corresponds to the wireless mobile two-way communications platform.

10. The apparatus of claim 8 wherein the controller is further configured to update the network location for the wireless mobile two-way communications platform by updating the network location in a manner that is compatible with an 802.16e-compatible protocol.

11. The apparatus of claim 10 wherein the controller is further configured to automatically provide to the wireless mobile two-way communications platform a false indication that the wireless mobile two-way communications platform has pending downlink traffic by using a downlink traffic pending (DTP) flag as comprises a part of updating the network location.

12. The apparatus of claim 8 wherein the controller is further configured to, subsequent to the false indication that the wireless mobile two-way communications platform has pending downlink traffic, automatically cause the wireless mobile two-way communications platform to conduct at least one of the authenticator relocation process and the Internet Protocol address renewal process.

13. The apparatus of claim 12 wherein the controller is further configured to effect the Internet Protocol address renewal process by using at least one of a client mobile Internet Protocol (CMIP) and proxy mobile Internet Protocol (PMIP)-compatible rebinding process.

14. A method comprising:

determining that a wireless mobile two-way communications platform is updating its network location;

determining that the wireless mobile two-way communications platform should conduct at least one of:

an authenticator relocation process;

an Internet Protocol address renewal process;

in response to determining that the wireless mobile two-way communications platform is updating its network location and determining that the wireless mobile two-way communications platform should conduct at least one of the authenticator relocation process and the Internet Protocol address renewal process, automatically providing to the wireless mobile two-way communications platform, as part of updating the network location for the wireless mobile two-way communications platform, a non-page-based message to thereby place the wireless mobile two-way communications platform into a state that will operationally support conducting at least one of the authenticator relocation process and the Internet Protocol address renewal process, wherein the non-page-based message comprising a false indication that the wireless mobile two-way communications platform has pending downlink traffic is automatically provided to the wireless mobile two-way communications platform although there is no downlink traffic to provide to the wireless mobile two-way communications platform.

15. The method of claim 14 further comprising:

subsequent to providing the non-page-based message, automatically causing the wireless mobile two-way communications platform to effect at least one of the authenticator relocation process and the Internet Protocol address renewal process.

* * * * *